US008680778B2

(12) United States Patent
Stevens et al.

(10) Patent No.: US 8,680,778 B2
(45) Date of Patent: Mar. 25, 2014

(54) LED DRIVER CIRCUIT

(75) Inventors: Frederick Stevens, Spennymoor (GB); Geoff Wallhead, Newton Aycliffe (GB); Daniel Rohner, Vienna (AT); Alexander Mair, Vienna (AT)

(73) Assignee: Tridonic Atco GmbH & Co. KG, Dornbirn (AT)

( * ) Notice: Subject to any disclaimer, the term of this patent is extended or adjusted under 35 U.S.C. 154(b) by 592 days.

(21) Appl. No.: 12/296,504

(22) PCT Filed: Jan. 19, 2007

(86) PCT No.: PCT/EP2007/000471
§ 371 (c)(1),
(2), (4) Date: Nov. 23, 2009

(87) PCT Pub. No.: WO2007/121798
PCT Pub. Date: Nov. 1, 2007

(65) Prior Publication Data
US 2010/0060189 A1    Mar. 11, 2010

(30) Foreign Application Priority Data

Apr. 21, 2006  (DE) .......................... 10 2006 018 531
Jul. 3, 2006   (DE) .......................... 10 2006 030 655

(51) Int. Cl.
*H05B 37/02*    (2006.01)
(52) U.S. Cl.
USPC ........................... 315/291; 315/307; 315/308
(58) Field of Classification Search
USPC ....... 315/72, 129, 209 R, 291, 297, 307, 262, 315/274, 287, 185 R, 91
See application file for complete search history.

(56) References Cited

U.S. PATENT DOCUMENTS 4,914,355 A * 4/1990 Mertens et al. ............... 315/307
5,172,009 A   12/1992 Mohan
(Continued)

FOREIGN PATENT DOCUMENTS

EP   0 948 241    10/1999
EP   1 202 428     5/2002
(Continued)

OTHER PUBLICATIONS

International Search Report for PCT/EP2007/000471 dated May 9, 2007.
(Continued)

*Primary Examiner* — Douglas W Owens
*Assistant Examiner* — Henry Luong
(74) *Attorney, Agent, or Firm* — Marshall, Gerstein & Borun LLP

(57) ABSTRACT

An emergency-lighting device for operating a light-source, in particular an LED, comprises an energy storage unit, a charging circuit, to be supplied with a mains supply voltage ($U_{in}$), for charging the energy storage unit during charging operation, the charging circuit comprising a potential separation, and also a driver circuit, supplied by the energy storage unit during emergency-light operation, for operating the light-source. Furthermore a control unit is provided which is designed for monitoring the state of the mains supply voltage ($U_{in}$) during charging operation and, when an emergency condition is detected, for activating emergency-light operation, the control unit ascertaining the state of the mains supply voltage ($U_{in}$) on the basis of operating variables of the emergency-lighting device which are measured on the output side of the charging circuit.

20 Claims, 4 Drawing Sheets

(56) References Cited

U.S. PATENT DOCUMENTS

| | | | |
|---|---|---|---|
| 6,198,405 B1* | 3/2001 | Andersson et al. | 340/815.45 |
| 6,320,330 B1* | 11/2001 | Haavisto et al. | 315/291 |
| 6,798,152 B2* | 9/2004 | Rooke et al. | 315/209 R |
| 6,858,994 B2* | 2/2005 | Vollrath | 315/200 A |
| 7,538,499 B2* | 5/2009 | Ashdown | 315/309 |
| 2003/0173907 A1* | 9/2003 | Chen et al. | 315/291 |
| 2005/0001562 A1 | 1/2005 | Pederson | |
| 2005/0259448 A1* | 11/2005 | Koike | 363/21.01 |
| 2010/0327766 A1* | 12/2010 | Recker et al. | 315/291 |

FOREIGN PATENT DOCUMENTS

| | | |
|---|---|---|
| EP | 1 274 286 | 1/2003 |
| GB | 2 258 571 | 2/1993 |

OTHER PUBLICATIONS

"TL5001, TL5001A, Pulse-Width-Modulation Control Circuits", Texas Instruments, Apr. 1994 (Revised Jan. 2002), 32 pages.

* cited by examiner

LED DRIVER CIRCUIT

BACKGROUND OF THE INVENTION

1. Field of the Invention

The present invention relates to circuits for operating light-emitting diodes.

2. Related Technology

Even though in the present description the invention will be described with reference to emergency-lighting devices with LEDs, it is to be understood that the invention relates quite generally to LED-operating circuits.

Emergency-lighting devices accordingly exhibit by way of central element an energy storage unit—in particular, a battery or an accumulator—which during normal operation or charging operation is charged by the general mains supply voltage. For this purpose a charging circuit is provided which is connected to the mains supply voltage on the input side and permanently supplies energy during charging operation of the energy storage unit, which stores this energy. Only in the case where an emergency condition arises—which is ordinarily detected autonomously by devices of such a type through a monitoring of the mains supply voltage—is a change-over made to emergency-light operation, in which the light-source is activated and operated, to which end—where required—the energy made available by the energy storage unit is utilized. Since the storage capacity of the energy storage unit is of course limited, light-sources are preferably employed that consume relatively little energy. Accordingly, emergency-lighting devices of such a type are preferably equipped with gas-discharge lamps, in particular fluorescent tubes. However, light-sources in the form of light-emitting semiconductors, in particular LEDs, are also increasingly finding application, since these light-sources also exhibit a high efficiency and can accordingly be employed in energy-saving manner.

SUMMARY OF THE INVENTION

The invention provides a circuit for operating LEDs.

In one embodiment, invention provides a circuit for operating at least one LED, comprising:

a driver circuit with a coil and with a switch connected in series with the coil and clocked at a high frequency, wherein when the switch is closed the coil is magnetized and when the switch is open the coil demagnetized in the form of a current through the LED, wherein in the demagnetizing-current path when the switch is open a current-registering means is provided which supplies a current-registering signal to a control unit which ascertains the temporally averaged value of the current through the LED on the basis of the value of the registering signal at the end of the on-period cycle and also on the basis of the value at the end of the demagnetizing phase.

The control unit can adjust the switching frequency and/or the pulse duty factor in a manner depending at least on the registered temporal mean value of the current through the LED.

For the purpose of dimming the LED, the control unit can superimpose a comparatively low-frequency modulation on the high-frequency timing of the switch and/or can change the high-frequency timing.

The low-frequency modulation may be a pulse-width modulation.

The driver circuit may be supplied from a battery, where appropriate assisted by a mains voltage, or may be supplied purely by mains voltage.

A unit for registering the battery-discharge current may be provided which is functionally connected to the control unit, wherein for the purpose of regulating the battery-discharge current the current through the LED is adjustable in a manner depending on the registered battery-discharge current.

The battery may be connected to a charging circuit supplied with mains voltage.

The driver circuit can dim the LED if the mean value of the mains voltage falls below a threshold value.

The charging circuit may exhibit a flyback converter.

The flyback converter can be gated in pulsed manner if the mean value of the mains voltage falls below a threshold value.

A circuit for registering the battery voltage may be provided.

The current through the LED may be adjustable in a manner depending on an output signal of the circuit for registering the battery voltage.

The battery-charging current can be registered and, where appropriate, regulated.

The control unit can register the LED voltage.

At start-up the control unit can perform a test measurement of electrical parameters, in order to determine whether an LED or which LED is connected to the driver circuit.

The control unit can adjust the operating current through the LED in a manner depending on the outcome of the test measurement.

The test measurement may comprise applying a relatively small voltage by appropriate triggering of the driver circuit and in measuring the resulting LED current.

At start-up the control unit can increase the LED voltage, by appropriate triggering of the switch of the driver circuit, from a low value to a stationary operating value.

In another embodiment, the invention further provides a circuit for operating at least one LED, comprising:

a driver circuit with a coil and with a switch connected in series with the coil and clocked at a high frequency, wherein when the switch is closed the coil is magnetized and when the switch is open the coil demagnetized in the form of a current through the LED, wherein in the demagnetizing-current path when the switch is open a current-registering means is provided which supplies a current-registering signal to a control unit, further comprising a unit for registering the battery-discharge current which is functionally connected to the control unit, wherein for the purpose of regulating the battery-discharge current the current through the LED is adjustable, in a manner depending on the registered battery-discharge current, by adjustment of the switching behavior of the switch of the driver circuit.

The invention also provides a circuit for operating at least one LED, comprising:

a driver circuit with a coil and with a switch connected in series with the coil and clocked at a high frequency, wherein when the switch is closed the coil is magnetized and when the switch is open the coil demagnetized in the form of a current through the LED, wherein in the demagnetizing-current path when the switch is open a current-registering means is provided, further comprising a circuit for registering the battery voltage, wherein the current through the LED is adjustable, in a manner depending on an output signal of the circuit for registering the battery voltage, by adjustment of the switching behavior of the switch of the driver circuit.

A further aspect of the invention relates to a circuit for operating at least one LED, comprising:

a driver circuit with a coil and with a switch connected in series with the coil and clocked at a high frequency, wherein when the switch is closed the coil is magnetized and when the switch is open the coil demagnetized in the form of a current through the LED, wherein in the demagnetizing-current path when the switch is open a current-registering means is provided which supplies a current-registering signal to a control unit, the control unit performing a test measurement of electrical parameters at start-up, in order to determine whether an LED or which LED is connected to the driver circuit.

The invention further relates to a circuit for operating at least one LED, comprising:

a driver circuit with a coil and with a switch connected in series with the coil and clocked at a high frequency, wherein when the switch is closed the coil is magnetized and when the switch is open the coil demagnetized in the form of a current through the LED, wherein in the demagnetizing-current path when the switch is open a current-registering means is provided which supplies a current-registering signal to a control unit, the control unit increasing the LED voltage at start-up, by appropriate triggering of the switch of the driver circuit, from a low value to a stationary operating value.

An emergency-lighting device may comprise a circuit of the type stated above.

The invention also provides a process for ascertaining the current through an LED which is operated by a circuit that comprises:

a coil and a switch connected in series with the coil, wherein when the switch is closed the coil is magnetized and when the switch is open the coil demagnetized in the form of a current through the LED, wherein in the demagnetizing-current path when the switch is open a current-registering means is provided which supplies a current-registering signal, wherein the temporally averaged value of the current through the LED is ascertained on the basis of the value of the registering signal at the end of the on-period cycle and also on the basis of the value at the end of the demagnetizing phase.

A further process for operating an LED with a circuit is provided, the circuit comprising:

a coil and a switch connected in series with the coil, wherein when the switch is closed the coil is magnetized and when the switch is open the coil demagnetized in the form of a current through the LED, wherein in the demagnetizing-current path when the switch is open a current-registering means is provided which supplies a current-registering signal, wherein the LED is operated from a battery, wherein the battery-discharge current is registered and for the purpose of regulating the battery-discharge current the current through the LED is adjusted, in a manner depending on the registered battery-discharge current, by adjustment of the switching behavior of the switch of the driver circuit.

A further aspect of the invention relates to a process for operating an LED with a circuit that comprises:

a coil and a switch connected in series with the coil, wherein when the switch is closed the coil is magnetized and when the switch is open the coil demagnetized in the form of a current through the LED, wherein in the demagnetizing-current path when the switch is open a current-registering means is provided which supplies a current-registering signal, wherein the LED is operated from a battery, wherein the battery voltage is registered and the current through the LED is adjusted, in a manner depending on an output signal of the circuit for registering the battery voltage, by adjustment of the switching behavior of the switch of the driver circuit.

A yet further aspect of the invention relates to a process for operating an LED with a circuit that comprises:

a coil and a switch connected in series with the coil, wherein when the switch is closed the coil is magnetized and when the switch is open the coil demagnetized in the form of a current through the LED, wherein in the demagnetizing-current path when the switch is open a current-registering means is provided which supplies a current-registering signal, wherein the LED voltage is increased at start-up of the circuit, by appropriate triggering of the switch of the driver circuit, from a low value to a stationary operating value.

BRIEF DESCRIPTION OF THE DRAWINGS

The invention will be described in more detail in the following on the basis of the appended drawings. Shown are.

DETAILED DESCRIPTION

Figure 1:
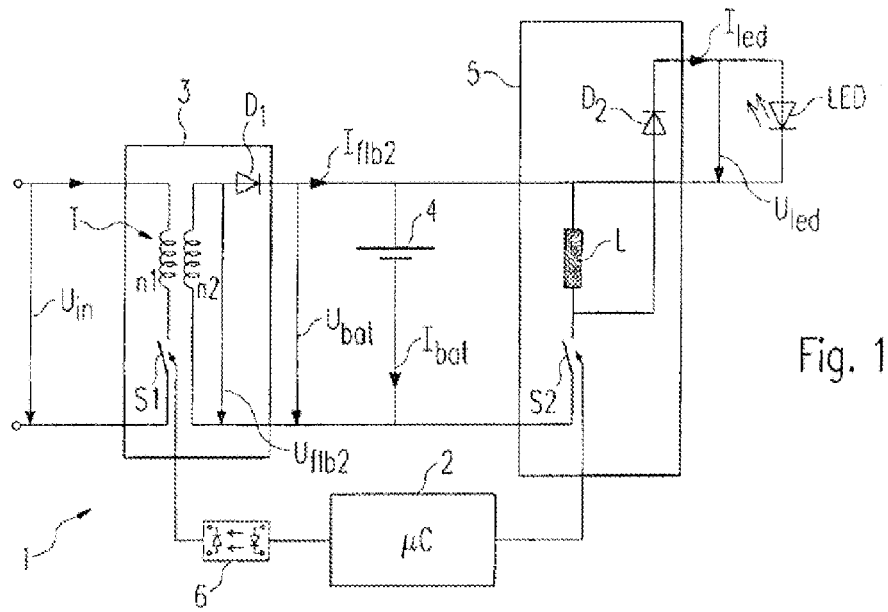
FIG. 1: schematically, the circuit diagram of a first exemplary embodiment of an emergency-lighting device according to the invention.

The emergency-lighting device according to the invention represented in simplified manner in FIG. 1 and provided generally with the reference symbol 1 is provided, in the exemplary embodiment that is represented, for the purpose of operating an LED by way of emergency light-source. The emergency-lighting device 1 is connected on the input side to a current-supply network which makes a mains supply voltage $U_{in}$ available, and comprises as essential components a control unit 2, a charging circuit 3, an energy storage unit 4 in the form of a battery or an accumulator, and also a driver circuit 5.

The charging circuit 3 is constituted, in the first exemplary embodiment that is represented, by a so-called flyback converter which comprises, on the one hand, a transformer T with a primary winding nl and a secondary winding n2 and also, on the other hand, a controllable switch SI. In known manner, by an appropriate alternating opening and closing of the switch SI, the energy made available by the mains supply voltage $U_{in}$ is transmitted to the secondary side of the flyback converter 3 and utilized for the purpose of charging the energy storage unit 4. The transmission of energy takes place in the open state of the switch SI, wherein for this purpose a diode $D_1$ is furthermore provided on the output side of the flyback converter 3. Flyback circuits of such a type often find application in emergency-lighting devices of such a type by reason of their simple structure and their reliable functioning.

Triggering of the controllable switch SI is effected by the control unit 2 of the emergency-lighting device, the triggering being effected, in particular, in a galvanically isolated manner via an optocoupler 6. In this connection the control unit 2 controls the switch SI in an alternating manner, the so-called duty cycle DI for the switching operation of the switch SI being calculated as follows:

$$D1 = t_{on1}/(T - t_{on1})$$

where $t_{on1}$ corresponds to the on-time of the switch, whereas T denotes the total period of a complete switching cycle for the switch SI.

It is also conceivable that, in connection with the triggering of SI, it is a question of a 'self-oscillator', and the natural frequency of the 'self-oscillator' is influenced over the duty cycle by the optocoupler 6.

During charging operation of the emergency-lighting device 1, ordinarily the charging circuit 3 exclusively is active, in order to charge the battery 4 continually. Only in the case where an emergency condition is present—which is characterized, in particular, by deviations in the mains supply voltage $U_{in}$ from predetermined set values—is emergency-light operation initiated, in which the driver circuit 5 is utilized for the purpose of triggering the LED. The driver circuit 5, which takes the form of a switching regulator, comprises for this purpose a further controllable switch S2, an inductance coil L and also a diode D2. By alternating triggering of the switch S2 by the control unit 2, in this way a current is made available to the LED, via which the latter is operated. The pulse duty factor with which the switch S2 is triggered by the control unit 2 may in this connection be varied, in order to adjust the level of the current supplied to the LED, and hence the power at which the LED is operated. In this way, it is possible to ensure in very elegant manner that also in the case of fluctuating battery power the LED is operated, despite everything, with constant brightness.

One function of the emergency-lighting device 1 accordingly comprises detecting, by assessment of the mains supply voltage $U_{in}$, whether an emergency condition is present, in order, where appropriate, to bring about emergency-light operation. Hitherto for this purpose it was known to determine the value of the input voltage $U_{in}$ for the charging circuit 3 directly, which, however, for the aforementioned reasons is associated with disadvantages.

In this connection a direct measurement of the mains supply voltage $U_{in}$ can be dispensed with. Instead of this, there is provision to ascertain its voltage by indirect means. In particular, there is provision that only magnitudes of operating parameters of the emergency-lighting device 1 on the secondary side of the charging circuit 3 are measured.

In the case of the first exemplary embodiment according to FIG. 1, for this purpose the voltage $U_{fb2}$ applied on the secondary side of the blocking converter or flyback converter 3 is measured, for which purpose, in particular, no galvanic separation is required, since this variable is at the same reference potential as the control unit 2 which evaluates the measured value. Now if the level of this secondary voltage $U_{fb2}$ is known, then the level of the input voltage $U_{in}$ can be inferred from this. This is because, with the switch SI of the flyback converter 3 switched on, there is a relationship between input voltage $U_{in}$ and secondary voltage $U_{fb2}$, which, in particular, is dependent on the turns ratio of the two windings nI and n2 of the transformer T and also on the duty cycle of the switch DI. This relationship between the secondary voltage $U_{fb2}$, which is easy to measure, and the input voltage $U_{in}$ to be monitored is now saved in the control unit 2 in the form of a table of values, so that after measurement of the secondary voltage $U_{fb2}$ the control unit can determine the level of the input voltage $U_{in}$ in straightforward manner without having to measure it directly. If the control unit 2 now establishes that the ascertained input voltage $U_{in}$ lies outside certain set-value ranges, this points to an emergency condition which in turn will cause the control unit 2 to initiate emergency operation.

The solution that has been described accordingly enables a very simple but effective monitoring of the state of the general power supply. Furthermore, a particular advantage of the exemplary embodiment represented in FIG. 1 comprises the fact that the level of the input voltage $U_{in}$ can be determined irrespective of whether the emergency-light LED is switched on or not. This is because the diode D1 brings about, by virtue of its blocking action, a separation between secondary voltage $U_{fb2}$ and battery voltage $U_{Bat}$, so that the action of the driver circuit 3 does not affect the previously described procedure of the determination of the input voltage $U_{in}$.

Figure 2:
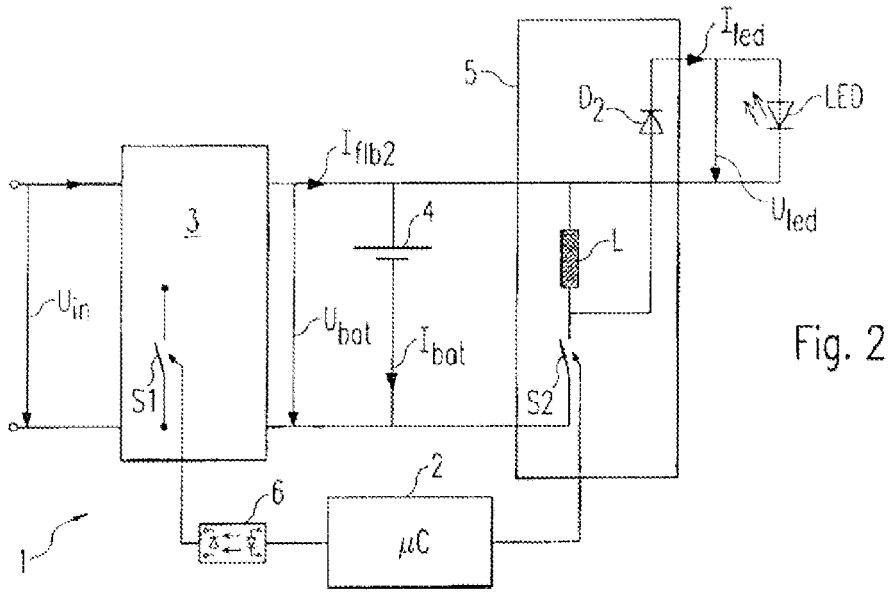
FIG. 2: a second exemplary embodiment of an emergency-lighting device.

A second, somewhat more general, exemplary embodiment of an emergency-lighting device according to the invention is represented in FIG. 2. In its structure, this embodiment corresponds substantially to the emergency-lighting device 1 shown in FIG. 1, but the charging circuit 3 is now constituted not by a flyback converter but generally by a circuit arrangement that comprises a potential separation and also a switch SI which once again is triggered by the control unit 2.

In this more general embodiment there is not necessarily a known relationship between the input voltage $U_{in}$ and the voltage on the output side of the charging circuit 3. Nevertheless, here too the level of the input voltage $U_{in}$ can be determined by indirect means, wherein, however, other operating variables are now measured for this purpose.

In this connection it is a question, on the one hand, of the battery voltage $U_{bat}$ and also, on the other hand, of the battery current $I_{bat}$. Both variables can, once again, be determined relatively easily—that is to say, without galvanic separation—since once again, just like the control unit 2 which evaluates these measured variables, they are at the same reference potential.

Figure 3:
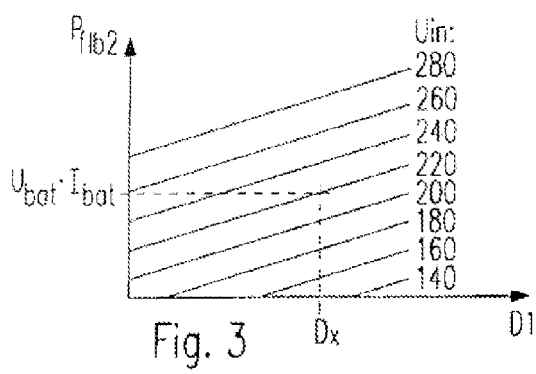
FIG. 3: a graph for ascertaining the mains supply voltage on the basis of operating parameters measured on the output side of the charging circuit.
Figure 4:
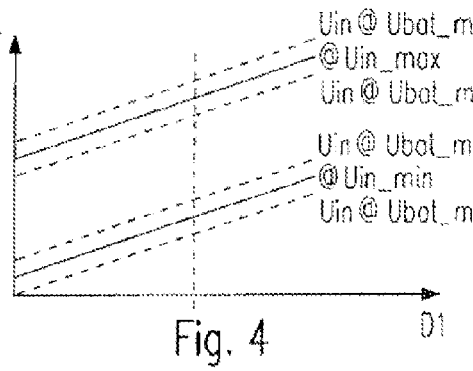
FIG. 4: another graph for ascertaining the secondary output of the charging circuit, which is taken into account for the purpose of indirect determination of the power of the light-source.

On the basis of these two measured variables $U_{bat}$ and $I_{bat}$, and also on the basis of the known duty cycle DI for the switch SI of the charging circuit 3, the input voltage $U_{in}$ can then be determined, since the latter is related to the three known variables. This is illustrated by the graph of FIG. 3, which shows differing characteristics of the secondary output $P_{fb2}$ of the charging circuit 3 as a function of the duty cycle DI for the switch SI. These characteristics are ascertained, for example, in the course of the production of the emergency-lighting device and are again saved in the form of a table in the control unit 2. It can be discerned that these characteristics are, in particular, also dependent on the input voltage $U_{in}$. Accordingly, if the duty cycle D1 and also the secondary output $P_{fb2}$ of the charging circuit 3 are now known, then, just as in the example shown in FIG. 1, the level of the input voltage $U_{in}$ can be inferred.

In the example shown in FIG. 3, it is accordingly ascertained with which characteristic the known combination of duty cycle DI and secondary output $P_{fb2}$ of the charging circuit 3 coincides, which, when the driver circuit 5 is deactivated, corresponds to the product of battery voltage $U_{bat}$ and battery current $I_{bat}$. In the case of the represented measured values, for example, this value lies on the characteristic for an input voltage $U_{in}$ of 220 volts, corresponding to an orderly state of the general mains supply. However, if the ascertained value were to lie on a characteristic that corresponds, for example, to an input voltage $U_{in}$ of 140 volts or 280 volts, then the control unit 2 would, in turn, interpret this to the effect that a fault in the mains supply is present, and would accordingly initiate an emergency condition.

In both the exemplary embodiments shown, it can accordingly be established, reliably and without the requirement for a direct measurement of the input voltage $U_{in}$, whether the mains supply is in order or not. However, a limitation in the case of the example shown in FIG. 2 comprises the fact that the described evaluation of the input voltage $U_{in}$ is only possible in the switched-off state of the driver circuit 5. In the case of the example shown in FIG. 1, on the other hand, this limitation—as already mentioned—does not exist. In principle, however, in the case where a fault is detected the control unit 2 will bring about an activation of the driver circuit 5 and accordingly a switching-on of the LED.

After activation of the driver circuit 5, the switch S2 can then be triggered at a high frequency in the manner previously described, in order to operate the LED with a desired power. In order to ensure in this case that the power of the LED is constant, it would be necessary to know both the LED voltage $U_{led}$ and the LED current $I_{led}$, in order to enable regulation.

Having reference to FIG. 5, particulars of the interconnection of the battery 4 will now be described.

Figure 5:
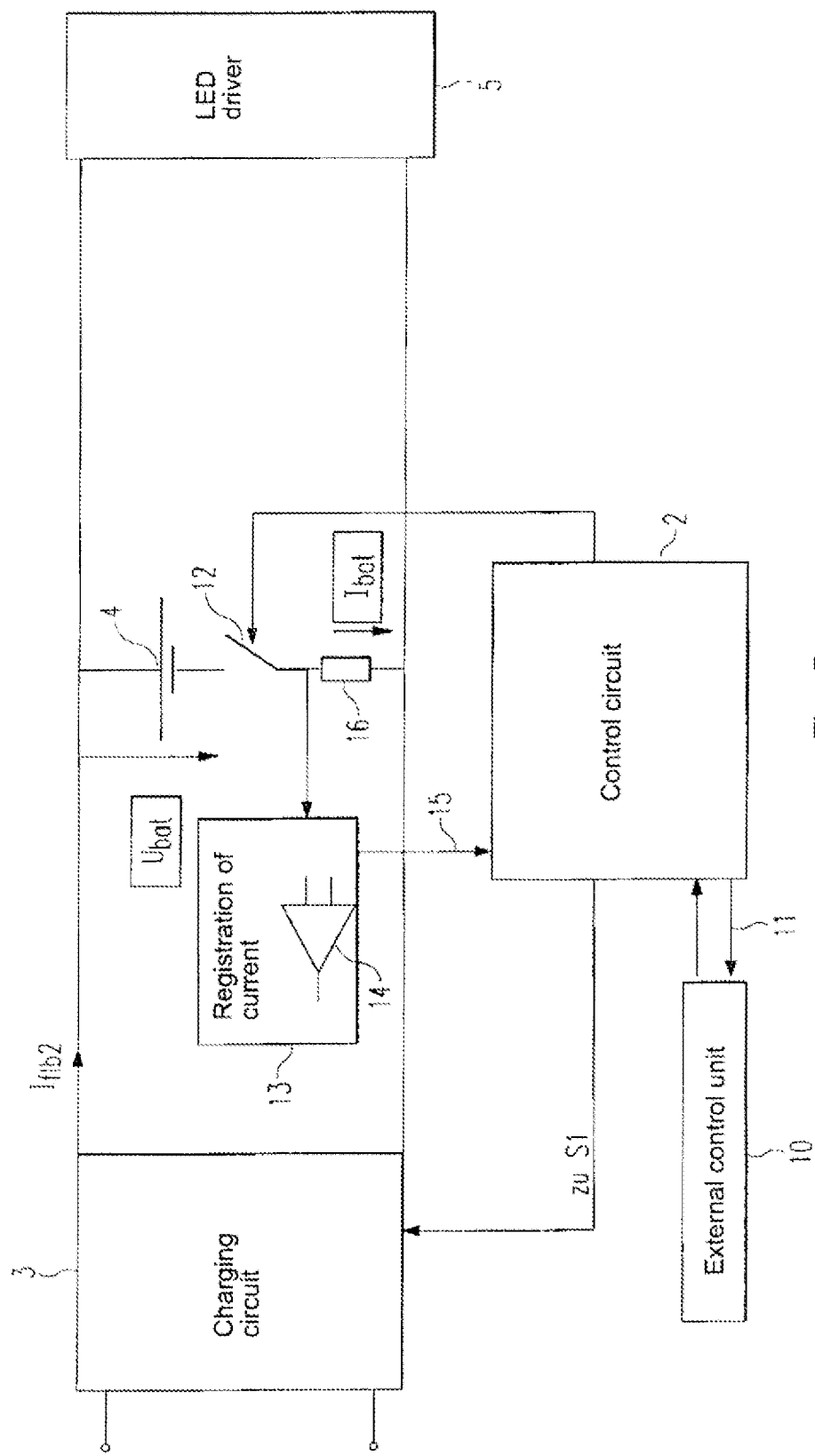
FIG. 5: an illustration of a battery circuit according to the invention.

As is evident in FIG. 5, parallel to the battery 4 an element 12 is interconnected that may have the function of a linear regulator and/or a switch. For example, this element 12 may be a transistor. Connected in parallel to the battery 4 is, moreover, a measuring resistor (shunt) 16, so the drop in voltage at the shunt 16 is representative of the battery current.

The measuring signal picked up at the shunt 16 is supplied to a current-registering unit 13, which is preferably constructed as a discrete circuit and may exhibit a comparator 14. The comparator 14 is only one example of how an offset can be applied to the measuring signal by the shunt 16. The application of the offset serves to be able to enable evaluation, in simplified manner, of signals reproducing the battery current with differing polarities, by choosing the offset in such a way that the signal-levels are shifted in such a way that both signal polarities now exhibit the same polarity, though differing amplitudes. Consequently, both the battery-charging current and the battery-discharge current, which are known to have differing polarities, can be measured in a relatively simple manner, for example by means of the control circuit 2. Consequently a measuring signal 15 with uniform polarity is preferably supplied to the control circuit 2.

If the transistor 12 takes the form of a linear regulator, a regulation of the battery-discharge current and/or battery-charging current to a predetermined set value can be carried out by means of the current-registering unit 13 and triggering of the linear regulator 12. In simplified manner this regulation may, of course, also be carried out in the form of a protection circuit, so that in the case of a battery-charging current or battery-discharge current that is far too high the switch 12 is opened, in order to spare the battery 4.

In the case of a very prolonged failure of the mains voltage, an excessive discharge of the battery 4 may occur. If the battery 4 has been excessively discharged, it comprises a voltage of, for example, 1.3 volts, which accordingly lies below the admissible voltage of, for example, 1.5 volts. Even if an orderly mains voltage is now applied to the charging circuit 3 on the input side, and the charging circuit 3 is operated properly in the manner described above, the excessively discharged battery 4 will pull the secondary side of the charging circuit to the one inadmissibly low value.

In accordance with the invention, this excessive discharge can be registered or detected by means of registration of the voltage of the battery 4. When an excessive discharge of such a type is registered, the switch 12 is preferably operated in a clocked manner. In this connection the switch 12 is preferably closed only for a relatively short period of time, wherein in this short period of time a charging process of the battery 4 is undertaken. After this, however, the switch 12 is opened again for a longer period of time, so that the battery 4 is cut off from the secondary side of the charging circuit 3, and on the secondary side the charging circuit 3 can again make available the orderly or prescribed voltage of, for example, 1.5 volts. Consequently a prescribed voltage ratio is present on the secondary side during a far longer period of time.

Consequently there is a pulse-like charging of the excessively discharged battery.

While the switch is 12 open, the one mains voltage which is again applied supplies the connected LED driver circuit and LEDs correctly by means of the charging circuit. When the switch is briefly closed, on the other hand, the battery is sparingly recharged. For example, the pulse duty factor for the switch 12 can be chosen in such a manner that it is closed only during 10% of the total time period and correspondingly opened for 90%, so that the battery is able to recover during this 90% time period.

In the case where an excessive discharge of the battery is registered by means of the registration of the battery voltage, a change-over to this pulsed operation of the switch 12 can take place automatically. Monitoring of the battery voltage is preferably effected via a discrete circuit and consequently independently of the microcontroller 2 (see FIGS. 1, 2) which, after all, is possibly not fully functional in the case of a battery voltage that is too low.

In other respects, for this reason the current-registering circuit 13 with the comparator 14 is preferably also chosen to be a discrete circuit and consequently independent of the microcontroller 2 and the orderly operation thereof.

Figure 6:
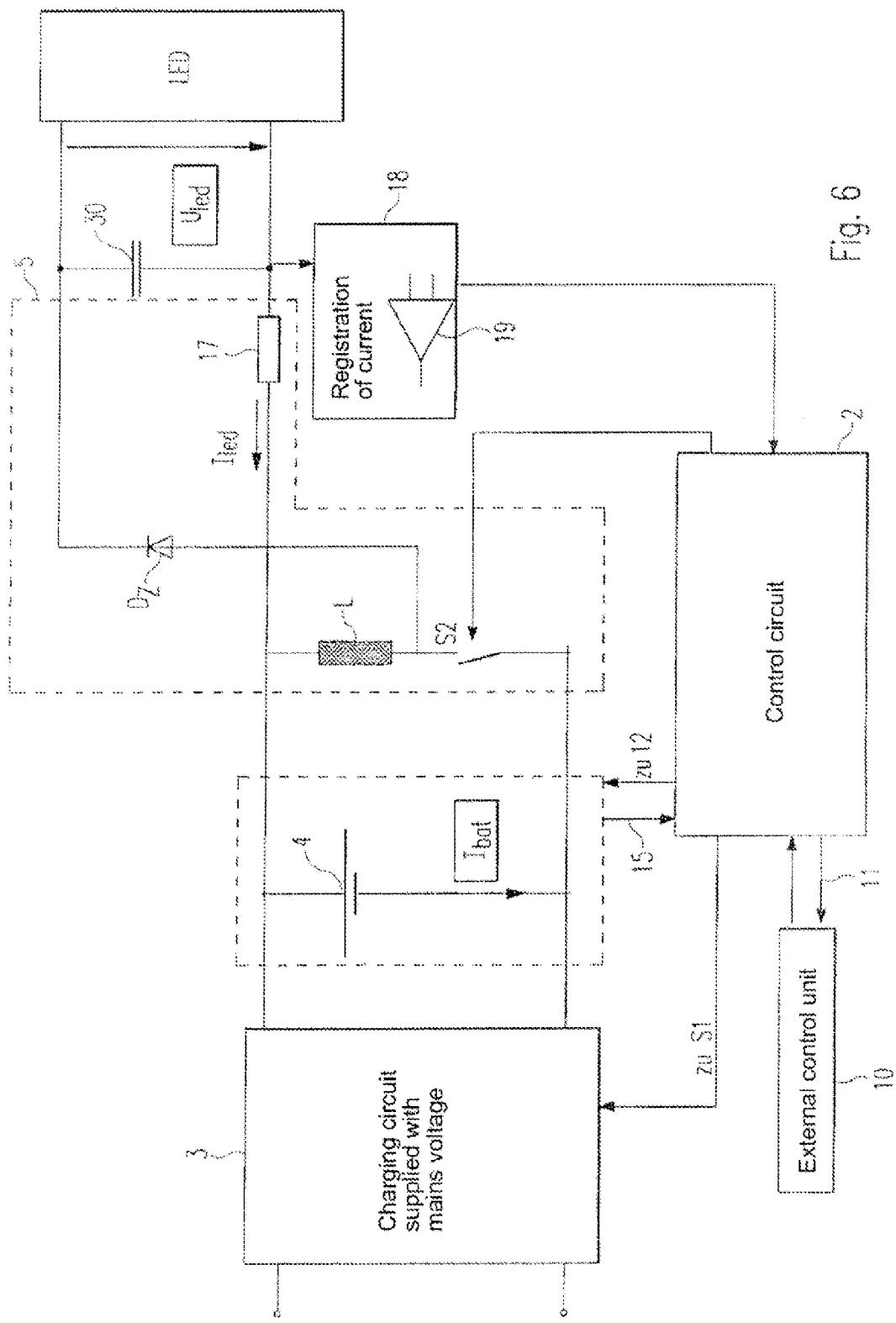
FIG. 6: an LED driver circuit according to the invention.

FIG. 6 shows further particulars relating to an LED driver circuit 5 according to the invention. All the features of the battery circuit of FIG. 5 may in other respects (optionally) be combined with the circuit of FIG. 6.

The basic principle of the driver circuit 5 is, as already described in the introduction, a switching regulator, in which the coil L is magnetized when the switch S2 is closed and when the switch S2 is opened again the magnetic energy discharges via a current path that comprises, in series, a Zener diode, at least one LED and also an ohmic resistor 17.

As is generally known, it is relatively easy to measure the flow of current through the diodes when the switch S2 is closed.

On the other hand, it is somewhat more complex to measure the flow of current through the LEDs when the switch S2 is open.

For the purpose of registering the current, in accordance with the invention the resistor 17 is connected in series to the LEDs, this resistor 17 representing an example of a current-registering means.

A current-registering unit 18 may, for example, exhibit a comparator 19.

A current-registering signal, i.e. a signal reproducing the current through the LEDs, is supplied to the control circuit 2. The control circuit 2 can configure the switching behavior of the switch S2, inter alia, in a manner depending on the current-registering signal.

A capacitor 30 is connected in parallel to the at least one LED. The capacitor 30 smoothes the LED current by storing energy and keeping the voltage over the at least one LED substantially constant. In this connection the capacitor 30 is dimensioned in such a manner that regulation of the LED voltage continues to be possible.

Figure 7:
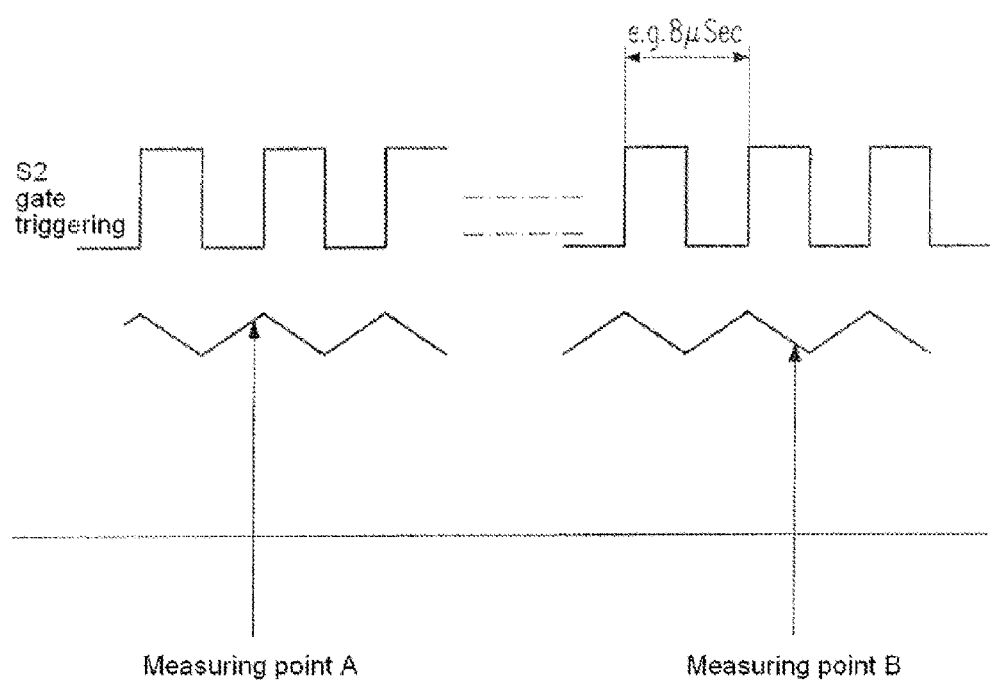
FIG. 7: the triggering of the driver switch and also the resulting diode current.

FIG. 7 shows schematically the triggering of the switch S2—that is to say, in the case where this switch takes the form of a FET transistor, the triggering of the gate of this transistor, viewed together with the current arising through the LEDs. During the on-period of the switch S2, the current through the LEDs rises in each instance. During the off-period, it falls again, driven by the magnetic energy of the coil L. Consequently a zigzag progression—around a fixed DC value—of the current through the LED arises. The registration of current is now to be capable of ascertaining, in particular, the temporal mean value of this current, in order consequently, for example, to be able to select the power of the LEDs either to a constant value or to a freely selectable value (dimming).

In accordance with the invention there is provision that the control circuit 2, which presets and consequently knows the switching behavior of the switch S2, ascertains the current value at a first measuring point A and also at a second measuring point B, in order again to derive the mean value therefrom. From the mean value of the current value at measuring time A and measuring time B the temporal mean value of the LED current then follows.

Measuring point A is in this connection chosen in such a way that it lies within the range of the end of the switching-off of the switch S2, whereas time B is chosen in such a manner that it lies at the end of the on-period.

Preferably a measurement of several minimal and maximal values is carried out for a measuring cycle. Consequently it is possible for inaccuracies with respect to the measuring time to be averaged out. For this principle of measurement, the measuring times are synchronized with the timing of the switch S2. However, in the course of this synchronization inaccuracies may occur which, for example, are due to the delays of A/D converters. These inaccuracies are averaged out by the registering several values.

Consequently the temporal mean value of the current through the LED can accordingly be registered, and the control unit 2 can adjust, in a manner depending thereon, the switching-frequency and/or the pulse duty factor of the switch S2. For the purpose of dimming the LED, the control unit 2 can, for example, superimpose a comparatively low-frequency modulation—for example, in the form of a pulse-width modulation—on the high-frequency timing of the switch S2. This represents an alternative or additional possibility for the purpose of dimming, since, as explained above, dimming may also be effected by a change of the high-frequency timing of the switch S2 itself.

In accordance with the invention, however, dimming of the LED, i.e. the adjustment of the LED current to a defined selectable value, can also be effected in a manner depending on other variables. For example, dimming can be effected in a manner depending on a registered battery-discharge current (see circuit of FIG. 5), in order consequently to extend the life of the battery.

The driver circuit 5 can also dim the LED if the mean value of the mains voltage which supplies the charging circuit 3 falls below a predetermined value. As a further assisting measure for extending the life of the battery, the flyback converter in the charging circuit 3 can be set to pulsed operation, so that the flyback converter accordingly supplies the driver circuit 5 in a manner assisting the battery voltage, which is becoming weaker.

In order to register a discharge of the battery voltage supplied to the battery 4, the battery voltage can be registered (see again FIG. 5).

Moreover, in addition to the registration of the LED current a registration of the LED voltage may be undertaken.

In accordance with the invention, a soft-start function may be provided, in the course of which the control circuit 2 at start-up firstly allows a relatively small test current to flow through the LED(s). The test measurement is intended to ascertain electrical parameters, in order to determine whether an LED or which LED is connected to the driver circuit 5. For example, it can be ascertained which LED voltage arises in the case of the predetermined test current. From this, inferences as to the type (color) and number of the connected LEDs can be drawn, in order once again to regulate, in a manner depending thereon, the stationary operating current in a manner adapted to the ascertained types of LED.

In principle, there may be provision that the control unit 2 increases the LED current at start-up, by appropriate triggering of the switch S2 of the driver circuit 5, from a low value to the stationary operating value for the LED current.

If the application of the test current shows the absence of an LED or a fault of an LED, at predetermined intervals a repetition of the application of the test voltage can take place automatically until the insertion of a prescribed LED is registered.

As stated, the current through the LED can be effected either by superposition of a low-frequency modulation on the high-frequency timing of the switch S2 and/or by a change (pulse duty factor, frequency) in the high-frequency timing itself.

The invention claimed is:

1. A circuit for operating at least one LED, comprising:
   a driver circuit with a coil and with a switch which is connected in series with the coil and clocked at a high frequency, the switch being controlled by a control unit,
   wherein when the switch is closed the coil is magnetized and when the switch is open the coil is demagnetized in a form of a current through the LED,
   wherein in a demagnetizing-current path when the switch is open a current-registering means is provided which supplies a current-registering signal to the control unit, wherein the control unit is adapted to ascertain a temporally averaged value of the current through the LED on a basis of a value of the current-registering signal at an end of an on-time cycle and also on the basis of a value at an end of a demagnetizing phase, wherein for a purpose of dimming the LED the control unit superimposes a comparatively low-frequency modulation on a high-frequency timing of the switch.

2. The circuit according to claim 1, wherein the control unit adjusts a switching-frequency and/or a pulse duty factor in a manner depending at least on the registered temporally averaged value of the current through the LED.

3. The circuit according to claim 1, wherein for the purpose of dimming the LED, the control unit superimposes the comparatively low-frequency modulation on the high-frequency timing of the switch, and/or wherein, for the purpose of dimming, the mean value of the current through the LED is effected by adjustment of a pulse duty factor and/or of a switching-frequency of the switch which is clocked at the high frequency.

4. The circuit according to claim 1, wherein the low-frequency modulation is a pulse-width modulation.

5. The circuit according to claim 1, wherein the driver circuit is supplied from a battery voltage and/or from an AC mains voltage.

6. The circuit according to claim 5, comprising a unit for registering a battery-discharge current which is functionally connected to the control unit, wherein for a purpose of regulating the battery-discharge current the current through the LED is adjustable in a manner depending on the registered battery-discharge current.

7. The circuit according to claim 5, wherein the battery is connected to a charging circuit supplied with mains voltage.

8. The circuit according to claim 7, wherein the driver circuit dims the LED if a mean value of the mains voltage falls below a threshold value.

9. The circuit according to claim 7, wherein the charging circuit comprises a flyback converter.

10. The circuit according to claim 9, wherein the flyback converter is gated in pulsed manner if a mean value of the mains voltage falls below a threshold value.

11. The circuit according to claim 5, further comprising a circuit for registering the battery voltage.

12. The circuit according to claim 11, wherein the current through the LED is adjustable in a manner depending on an output signal of the circuit for registering the battery voltage.

13. The circuit according to claim 5, wherein a battery-charging current is registered.

14. The circuit according to claim 1, wherein the control unit registers an LED voltage.

15. The circuit according to claim 1, wherein the control unit carries out a test measurement of electrical parameters at start-up, to determine whether the LED or which LED is connected to the driver circuit.

16. The circuit according to claim 15, wherein the control unit adjusts an operating current through the LED in a manner depending on an outcome of the test measurement.

17. The circuit according to claim 15, wherein the test measurement comprises an application of a relatively small test current by appropriate triggering of the driver circuit and in the measuring of a resulting LED voltage.

18. The circuit according to claim 1, wherein the control unit increases the LED current at start-up, by appropriate triggering of the switch of the driver circuit, from a low value to a stationary operating value.

19. An emergency-lighting device, comprising the circuit according to claim 1.

20. A process for operating at least one LED with a circuit that comprises:
   a driver circuit with a coil and with a switch which is connected in series with the coil and clocked at a high frequency, the switch being controlled by a control unit,
   wherein when the switch is closed the coil is magnetized and when the switch is open the coil is demagnetized in a form of a current through the LED,
   wherein in a demagnetizing-current path when the switch is open a current-registering means is provided which supplies a current-registering signal to the control unit, wherein the control unit is adapted to ascertain a temporally averaged value of the current through the LED on a basis of a value of the current-registering signal at an end of an on-time cycle and also on the basis of a value at an end of a demagnetizing phase, wherein for a purpose of dimming the LED the control unit superimposes a comparatively low-frequency modulation on a high-frequency timing of the switch.

* * * * *